Sept. 18, 1962 P. A. FORSYTH 3,054,895
BEYOND-THE-HORIZON COMMUNICATION SYSTEM UTILIZING
SIGNAL STRENGTH CONTROLLED SCATTER PROPAGATION
Filed May 10, 1954 4 Sheets-Sheet 1

INVENTOR
Peter Allen Forsyth
By Laeley, Stephens and Huettig
Attorneys

INVENTOR
Peter Allen Forsyth
By Bailey, Stephens and Huettig
Attorneys

Inventor
Peter Allan Forsyth
By Bailey, Stephens & Huettig
Attorneys

Inventor
Peter Allan Forsyth
By
Bailey, Stephens & Huettig
Attorneys 3,054,895
Patented Sept. 18, 1962

3,054,895

BEYOND-THE-HORIZON COMMUNICATION SYSTEM UTILIZING SIGNAL STRENGTH CONTROLLED SCATTER PROPAGATION

Peter Allan Forsyth, Ottawa, Ontario, Canada, assignor to Her Majesty the Queen in the right of Canada as represented by the Minister of National Defence, Ottawa, Ontario, Canada Filed May 10, 1954, Ser. No. 428,547
Claims priority, application Canada Jan. 26, 1954
10 Claims. (Cl. 325—15)

This invention relates to a new method of transmitting intelligence by radio at a frequency in the very high frequency spectrum in the range between 30 and 300 megacycles per second.

One of the greatest problems confronting the radio-communication field is the continual overcrowding of the available radio frequency bands. As a result of such overcrowding, radio transmissions have been and are being made at higher and higher frequencies.

The use of frequencies in the very high frequency spectrum has been limited, however, by the relatively short range over which transmissions at such frequencies may be satisfactorily made at an economical expenditure of power. When, for example, transmissions at very high frequencies are sent over distances exceeding approximately 300 miles it has been found necessary to use high power transmitter (about 10 to 40 kilowatts) in order that the received signal be continuously suitable for the transmission of intelligence.

Through the use of very high frequencies for radio transmission, however, it has been observed that signals at such frequencies are subject to spasmodic increases in strength of reception lasting for periods of a few seconds. These periods of increased strength are sometimes referred to as "bursts" and this term will be used throughout the following description.

Such bursts are caused by meteors which leave an ionized trail of considerable intensity when they enter the atmosphere. The ionization, caused chiefly by the heat produced by the friction between the molecules of air in the ionosphere and the meteors, is short-lived, lasting but a few seconds. These ionized-trails, however, can and do reflect very high frequency signals. Since this results in spasmodic reception, no useful method has, until now, been found of utilizing these bursts for the transmission of intelligence.

The present inventor has found that the frequency of occurrence of meteors across a given signal path is quite high and, furthermore, that there are relatively large tolerances with regard to the conditions which must be met in order to obtain reciprocity.

In general, the reciprocity theorem may be applied to radio communication systems. Thus, for a given signal path, the observed signal is independent of the direction in which the path is traversed.

Normally, as in the case of high frequency (i.e. 2–20 megacycles per second) layer type transmission, to obtain reciprocity the two propagation paths must be identical except for the direction in which they are traversed and the frequency of the signals must be substantially the same.

To effect simultaneous two-way transmission it is normally necessary to use separate frequencies and physically separated antennas at the termini. Such conditions would not be conducive to reciprocity in layer-type transmissions owing to the variations in the thickness of the layer. The present inventor has found that reciprocity does occur however, with signals reflected from meteor trails even when separate frequencies and separate antennas are used.

Thus, according to the present invention, a method of exploiting the characteristics of such bursts to transmit intelligence by radio at a frequency in the very high frequency spectrum between two stations spaced apart out of normal continuous readable reception range of one another at such frequency and at a selected transmission power, comprises continuously transmitting a control signal from a first of said stations to a second of said stations at a frequency in said spectrum and at a strength not above said transmission power, detecting said control signal at said second station, determining whether said detected control signal is at a readable level, automatically effecting transmission of an intelligence-modulated signal between said two stations during periods when said detected control signal is at a readable level, and automatically discontinuing transmission of said intelligence-modulated signal whenever said detected control signal falls below a readable level.

For purposes of clarity, the following is a list of certain terms used in the present specification, and the intended meanings of such terms:

*Continuous:* The word "continuous" when used in connection with the word "transmission" is intended to mean transmission maintained for as long as is necessary to transmit the intelligence it is desired to convey between the two stations.

*Readable:* The word "readable" is intended to define a signal which is at such a level that it is sufficiently distinguishable from background noise having regard to the nature of the intelligence transmitted and to the degree of error acceptable.

*Out of normal continuous readable reception range:* This phrase is intended to mean that distance (which, of course, varies in relation to the terrain separating two stations) over which it is impossible to obtain continuous readable reception of a very high frequency signal transmitted at a selected transmission power, yet over which it is possible to obtain short periods of readable reception due to the aforementioned bursts, e.g. a distance ranging from approximately 300 miles to approximately 900 miles.

It is an important advantage of the present invention that the selected transmission power referred to above may be very low, e.g. less than one kilowatt, for satisfactory operation. Good results have been obtained over a range of approximately 700 miles with a transmitter power of as little as 30 watts.

In the following description the abbreviation "V.H.F." is used to signify "very high frequency."

In the accompanying drawings, which illustrate the preferred embodiments of the present invention:

Figure 1:
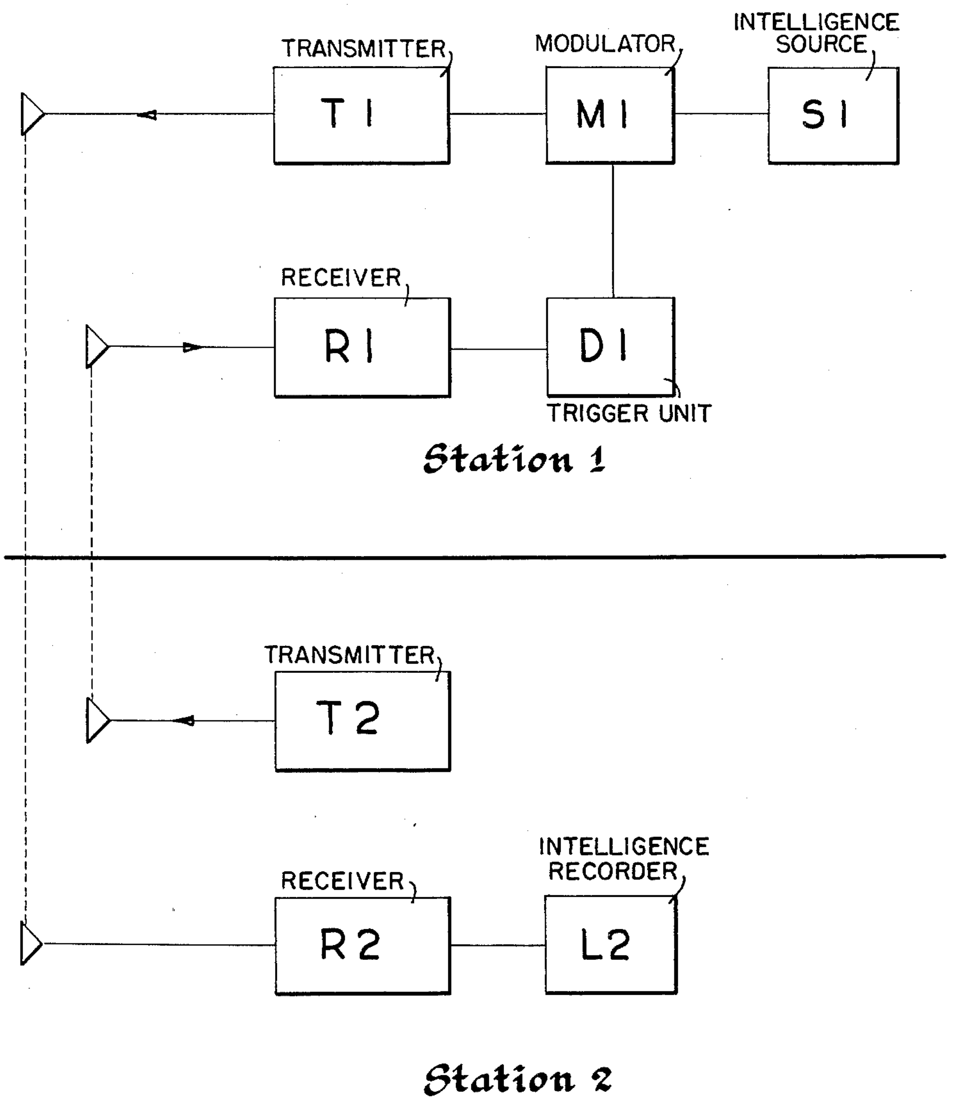
FIGURE 1 shows a block diagram of a long-range V.H.F. radio transmitting and receiving system.

Considering FIGURE 1, station 1 is the transmitting station and is equipped with a V.H.F. transmitter T1, a modulator M1 and an intelligence source S1. Station 1 is also equipped with a receiver R1 and trigger unit D1.

Station 2, the receiving station, is not only equipped with a receiver R2 and an intelligence recorder L2, but also with a V.H.F. transmitter T2.

In the operation of this system, the transmitter T2 is continuously transmitting a simple V.H.F. carrier wave a certain fixed amplitude below the critical amplitude so that the signal-strength of the carrier wave, upon reception, will be below the level suitable for the transmission of intelligence, except when reflected by the ionized trails of meteors. The carrier wave thus transmitted is received by receiver R1, of station 1, and the output thereof is applied to the trigger unit D1.

The trigger unit D1 is essentially a signal-operated switch sensitive to signal strength and may comprise, for example, a direct-coupled multi-vibrator followed by a relay. The multi-vibrator is set to strike as soon as the signal applied to it from the output of receiver R1 reaches a predetermined level or strength. As explained hereinabove, the signal received by R1 will vary in strength in accordance with ionospheric conditions and the predetermined level of signal-strength necessary to trigger the unit D1 should be such as to indicate suitable conditions for the transmission of intelligence.

Once the multi-vibrator of the trigger unit D1 is struck, the relay which follows the multi-vibrator will be closed and will remain closed as long as the multi-vibrator remains struck, i.e., as long as the strength of the signal received by receiver R1 remains at or above the predetermined level.

Figure 3:
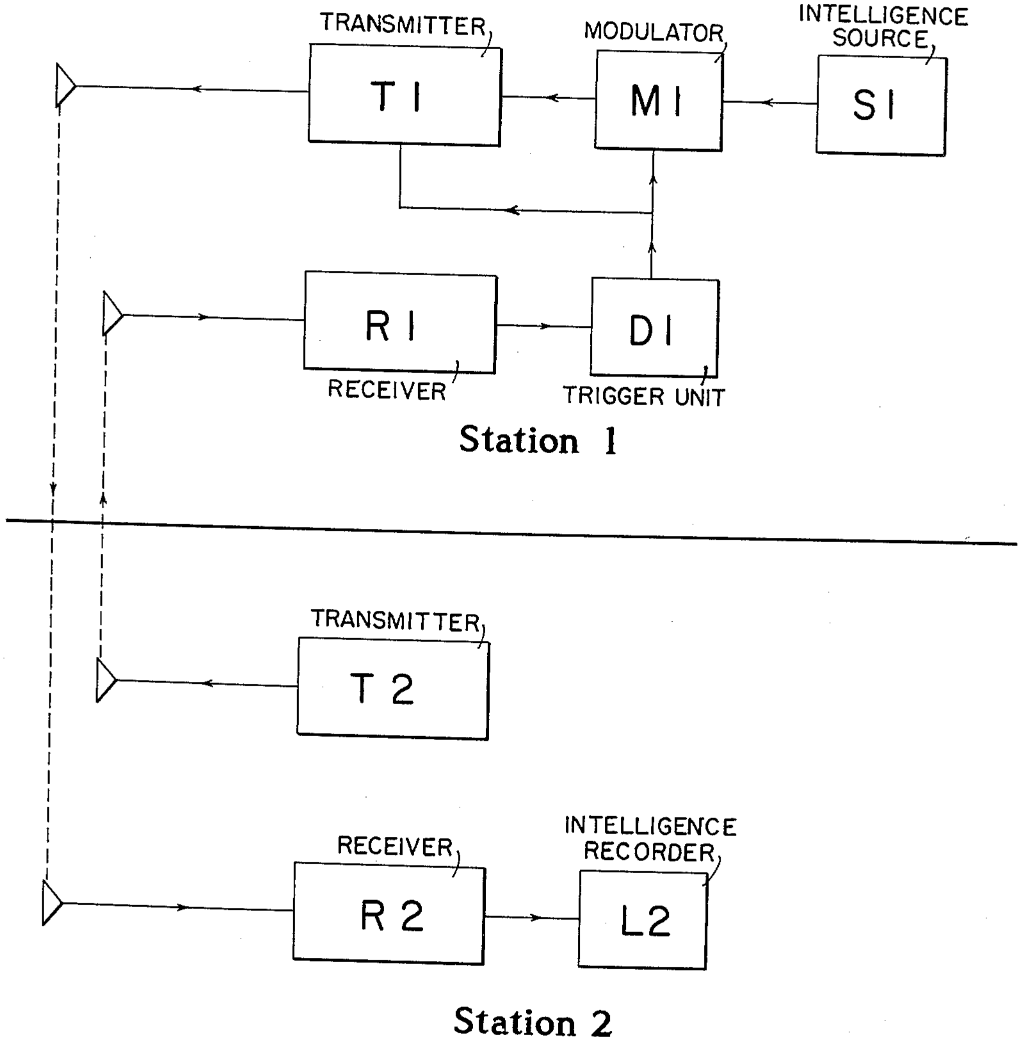
FIGURES 3 and 4 show further embodiments of the species of FIGURES 1 and 2 respectively.

The closing of the relay of trigger unit D1 in the form of FIGURE 3 serves to switch on the transmitter T1 and the modulator M1 both of which will continue to operate until the relays opens once again. If desired, of course, as shown in FIGURE 1, the transmitter T1 may operate continuously, the trigger unit D1 serving only to switch on the modulator M1 so modulating the V.H.F. carrier wave transmitted by transmitter T1.

It will be seen from the foregoing that the transmitter T1, at the transmitting station 1, only transmits intelligence during periods of reception when the signal level may be expected to be well above receiver noise level, e.g., 10–20 decibels above.

Since the bursts of increased signal-strength are usually of but a few seconds duration, it is considered preferable to have intelligence storage devices S1 and L2, S1 being a source of intelligence for transmission by station 1 and L2 storing the intelligence received at station 2. This will permit the transmission of intelligence at a very fast rate. The intelligence received by the receiver R2 and stored in the device L2 may then later be "played back" at a lower rate as a continuous, uninterrupted message.

Figure 2:
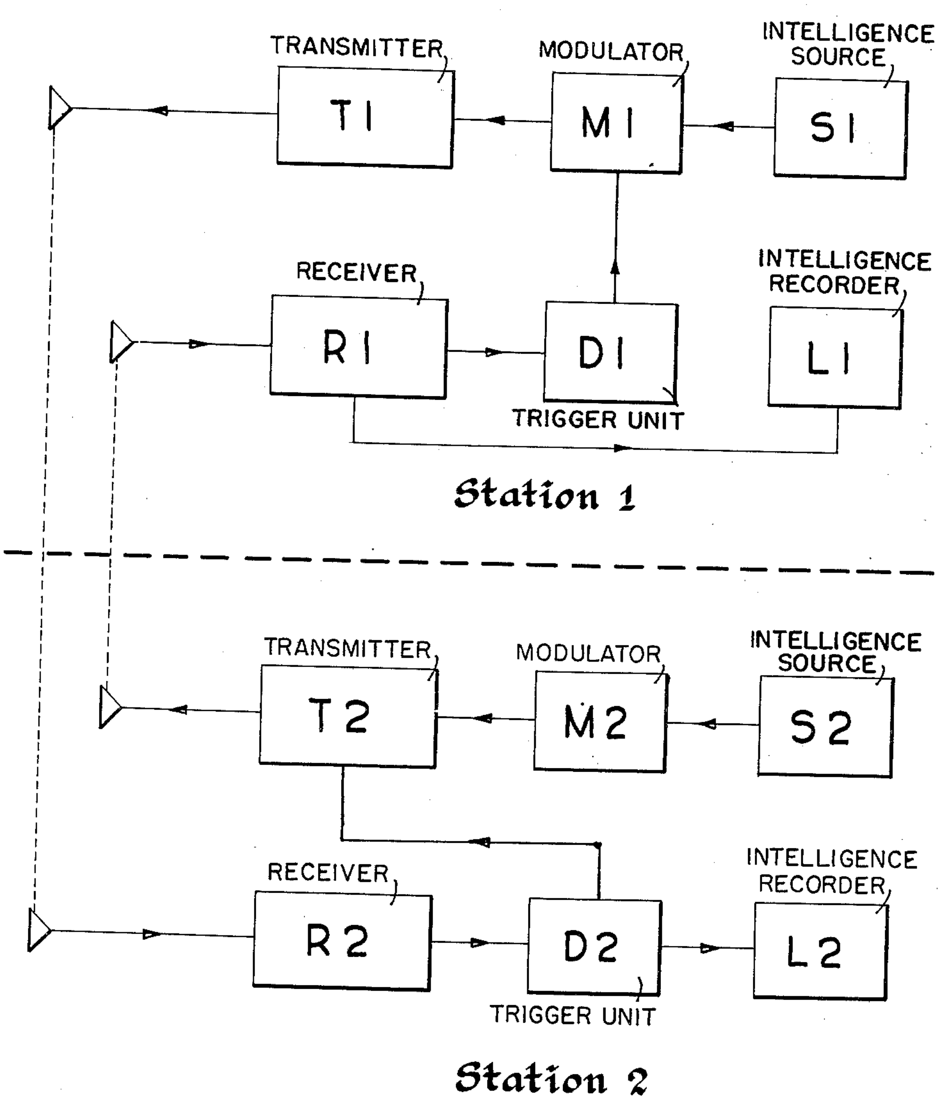
FIGURE 2 shows a modification of FIGURE 1.

Referring now to FIGURE 2, both station 1 and station 2 are similarly provided with transmitters T1 and T2, modulators M1 and M2, receivers R1 and R2 and trigger units D1 and D2. For the purpose of description station 1 is considered the transmitting station while station 2 is considered the receiving station. Thus, station 1 is provided with an intelligence source S1 and station 2 is provided with an intelligence recorder L2. Both stations, however, may be provided with both an intelligence source and an intelligence recorder as shown by the intelligence recorder L1 of station 1 and the intelligence source S2 of station 2. Thus, either station may transmit or receive as required.

In this embodiment, it is the transmitting station, station 1, which transmits a continuous V.H.F. carrier signal at an amplitude below the critical amplitude. This signal is detected by the receiver R2 which applies the signal to the trigger unit D2. The trigger unit D2 will switch on the transmitter T2 when the strength of the signal applied thereto from the output of the receiver R2 is above a predetermined level.

When switched on, the transmitter T2 transmits a carrier wave signal at a slightly different frequency from that transmitted by transmitter T1. This difference in frequency may be as much as 5 megacycles per second without causing an appreciable loss of reciprocity.

As soon as the signal transmitted by transmitter T2 is received by the receiver R1, it is applied to the trigger unit D1. Since transmitter T2 transmits only during periods of reception suitable for the transmission of intelligence, the strength of the signal transmitted thereby will, upon reception by receiver R1, be at or above the level necessary to actuate the trigger unit D1 which, when actuated, will switch on the modulator M1.

The signal transmitted by the transmitter T1 will now be modulated, conveying intelligence, which intelligence will be received by receiver R2 and stored by the recorder L2.

Figure 4:
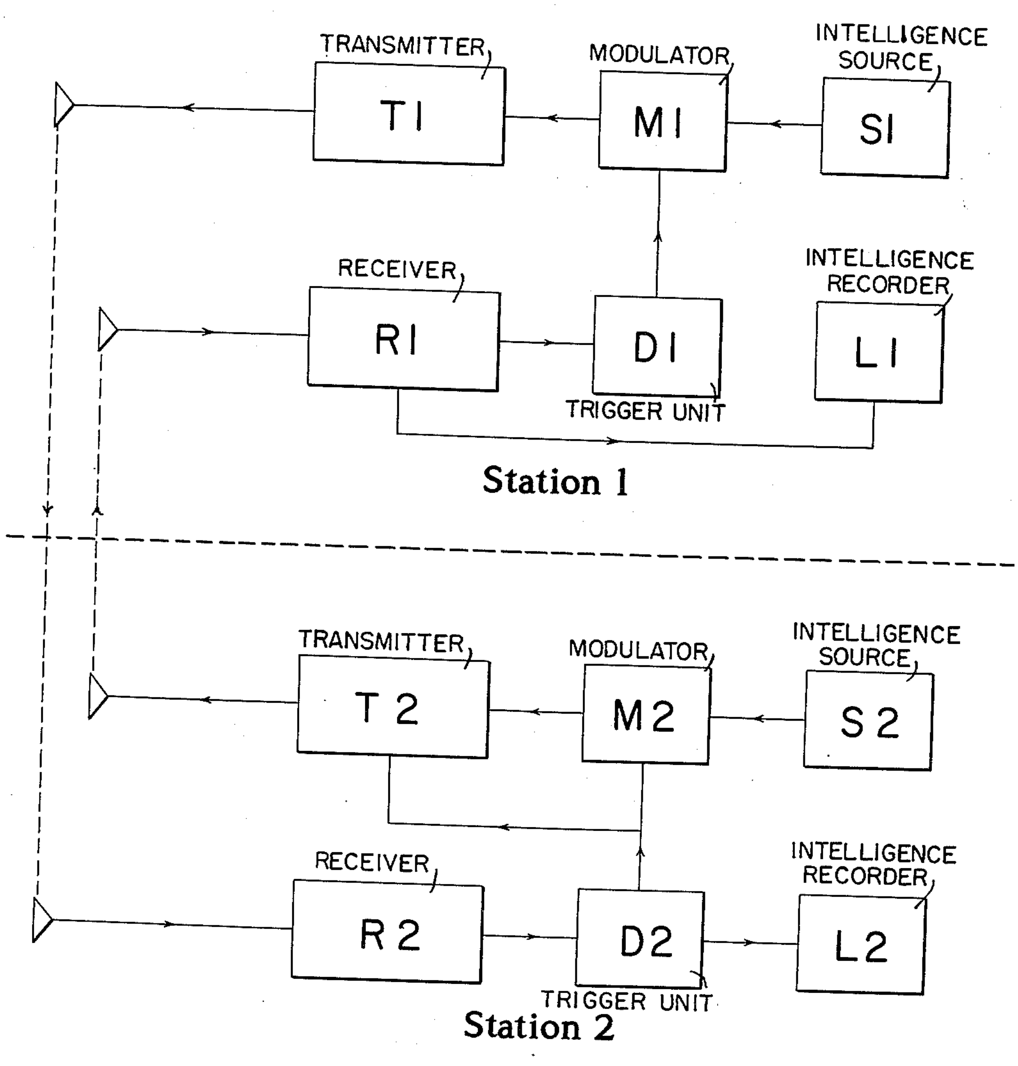

Although the transmission of intelligence in the foregoing has been from station 1 to station 2, it will be seen that, if desired, the trigger unit D2 of station 2 may be adapted to switch on both the transmitter T2 and the modulator M2 (FIGURE 4). Thus the signal from transmitter T2, which causes the modulation of the signal transmitted by the transmitter T1, will itself be modulated and conveying intelligence. The output of receiver R1 is not only applied to the trigger unit D1 but also to the recorder L1.

While the two embodiments are similar in operation, that of FIGURE 1 is suitable for use with methods where the intelligence is conveyed by means of either amplitude or frequency modulation while that of FIGURE 2 is more suitable for use with methods where the intelligence is conveyed by means of frequency modulation. The embodiment shown in FIGURE 2 may be of course, be used to convey intelligence in either direction and is, therefore, the preferred of the two embodiments.

Since the total time during which intelligence may be transmitted is dependent upon the number of meteors which cross the signal path, a split beam may be used for transmitting and receiving at each of the stations 1 and 2. Such a beam can be obtained by mounting two antennas (both transmitting or receiving, as the case may be) on a line at right-angles to the direction of propagation, separated by five wavelengths and fed in antiphase. The arrangement results in two beams directed about five degrees on either side of the line joining the two stations. There is reason to believe that this form of illumination results in a greater frequency of bursts, the number of suitable meteors crossing the path of the two beams being greater than the number crossing a single beam.

I claim:

1. Apparatus for transmitting intelligence by radio at a frequency in the very high frequency spectrum between two stations spaced at a distance apart at which continuous readable reception of one another is impossible at such frequency and at a selected transmission power, comprising means for continuously transmitting a control signal from a first of said stations to a second of said stations at a frequency in said spectrum and at a strength not above said transmission power, means for detecting said control signal at said second station, means for determining whether said detected control signal is at a readable level, means for automatically effecting transmission of an intelligence-modulated signal between said two stations during periods when said detected control signal is at a readable level, and means for automatically discontinuing transmission of said intelligence-modulated signal whenever said detected control signal falls below a readable level.

2. Apparatus for transmitting intelligence by radio at a frequency in the very high frequency spectrum between two stations spaced at a distance apart at which continuous readable reception of one another is impossible at such frequency and at a selected transmission power, comprising means for continuously transmitting a control signal from a first of said stations to a second of said stations at a first frequency in said spectrum and at a strength not above said transmission power, means for detecting said control signal at said second station, means for determining whether said detected control signal is at a readable level, means for automatically effecting transmission of an intelligence-modulated signal from said second station to said first station at a second frequency in said spectrum whenever said detected control signal is at a readable level, and means for automatically discontinuing transmission of said intelligence-modulated signal whenever said detected control signal falls below a readable level.

3. Apparatus as defined in claim 1, comprising means for storing intelligence to be transmitted, signal modulation means for deriving said intelligence modulated signal from said stored intelligence, and means for recording the intelligence transmitted by said intelligence modulated signal as it is received.

4. Apparatus as defined in claim 1, including a split beam antenna for transmitting said control signal in the form of a split beam.

5. Apparatus as defined in claim 2 in which said first and said second frequencies differ from one another by no more than approximately five megacycles per second.

6. Apparatus for transmitting intelligence by radio at a frequency in the very high frequency spectrum between two stations spaced at a distance apart at which normal continuous readable reception of one another is impossible at such frequency and at a selected transmission power comprising, means for continuously transmitting a first control signal from a first of said stations to a second of said stations at a first frequency in said spectrum and at a strength not above said transmission power, means for detecting said first control signal at said second station, means for determining whether said detected first control signal is at a readable level, means for automatically effecting transmission of a second control signal from said second station to said first station at a second frequency in said spectrum slightly different from said first frequency whenever said detected first control signal is at a readable level, means for automatically effecting transmission of an intelligence modulated signal from said first station to said second station, whenever said second control signal is detected at said first station, and means for automatically discontinuing transmission of said second control signal and said intelligence modulated signal, whenever said detected first control signal falls below a readable level.

7. Apparatus as defined in claim 6 wherein said first and said second frequencies differ from one another by no more than approximately five megacycles per second.

8. Apparatus for transmitting intelligence by radio at a frequency in the very high frequency spectrum between two stations spaced at a distance apart at which normal continuous readable reception of one another is impossible at such frequency and at a selected transmission power, comprising, means for continuously transmitting an unmodulated carrier wave from a first of said stations to a second of said stations at a first frequency in said spectrum and at a strength not above said transmission power, means for detecting said carrier wave at said second station, means for determining whether said detected carrier wave is at a readable level, means for automatically effecting transmission of a signal from said second station to said first station at a second frequency in said spectrum slightly different from said first frequency, whenever said detected carrier wave is at a readable level, means for automatically effecting modulation of said carrier wave to convey intelligence whenever said signal is detected at said first station and means automatically discontinuing transmission of said signal and modulation of said carrier wave whenever said detected carrier wave falls below a readable level.

9. Apparatus as defined in claim 8 wherein said first and said second frequencies differ from one another by no more than approximately five megacycles per second.

10. Apparatus as defined in claim 8 including means for storing the intelligence to be transmitted, means for modulating said carrier wave with said stored intelligence whenever said detected carrier wave is at a readable level, and means for recording the intelligence transmitted by said carrier wave, when modulated, as it is received.

References Cited in the file of this patent

UNITED STATES PATENTS

| | | |
|---|---|---|
| 2,067,432 | Beverage | Jan. 12, 1937 |
| 2,101,668 | Bishops et al. | Dec. 7, 1937 |
| 2,194,559 | Koch | Mar. 26, 1940 |
| 2,292,222 | Haigis | Aug. 4, 1942 |
| 2,326,290 | Dickieson | Aug. 10, 1943 |
| 2,369,230 | Hansell | Feb. 13, 1945 |
| 2,415,359 | Loughlin | Feb. 4, 1947 |
| 2,435,879 | Eilenberger | Feb. 10, 1948 |
| 2,467,299 | Espenschied | Apr. 12, 1949 |
| 2,521,696 | Armond | Sept. 12, 1950 |
| 2,629,092 | Herrick | Feb. 17, 1953 |
| 2,642,524 | Bayliss | June 16, 1953 |
| 2,678,998 | Young | May 18, 1954 |
| 2,694,140 | Gilman | Nov. 9, 1954 |
| 2,694,141 | Mitchell | Nov. 9, 1954 |